United States Patent
Shin

(10) Patent No.: US 8,559,492 B2
(45) Date of Patent: Oct. 15, 2013

(54) TRANSMITTER-ONLY IC CHIP HAVING EXTERNAL LOOPBACK TEST FUNCTION AND EXTERNAL LOOPBACK TEST METHOD USING THE SAME

(75) Inventor: Jongshin Shin, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 375 days.

(21) Appl. No.: 12/895,999

(22) Filed: Oct. 1, 2010

(65) Prior Publication Data

US 2011/0110412 A1     May 12, 2011

(30) Foreign Application Priority Data

Nov. 12, 2009    (KR) .......................... 10-2009-0109151

(51) Int. Cl.
     *H04B 3/46*        (2006.01)
(52) U.S. Cl.
     USPC ............ 375/224; 375/226; 375/228; 714/738
(58) Field of Classification Search
     None
     See application file for complete search history.

(56) References Cited

U.S. PATENT DOCUMENTS

| | | | |
|---|---|---|---|
| 6,477,674 B1 * | 11/2002 | Bates et al. | 714/738 |
| 7,685,489 B2 | 3/2010 | Takei et al. | |
| 2008/0086665 A1 | 4/2008 | Takei et al. | |
| 2009/0217113 A1 * | 8/2009 | Vandivier et al. | 714/727 |
| 2010/0073560 A1 * | 3/2010 | Kitano et al. | 348/554 |
| 2010/0313089 A1 * | 12/2010 | Rajski et al. | 714/731 |

FOREIGN PATENT DOCUMENTS

| | | |
|---|---|---|
| JP | 10-170606 | 6/1998 |
| JP | 2008-89518 | 4/2008 |
| KR | 1999-010539 | 2/1999 |
| KR | 10-2008-0031654 | 4/2008 |

* cited by examiner

*Primary Examiner* — Adolf Dsouza
(74) *Attorney, Agent, or Firm* — Onello & Mello, LLP

(57) ABSTRACT

A transmitter-only integrated circuit (IC) chip for performing an external loopback test without an additional receive pin in a chip and an external loopback test method include drivers, mounted on the transmitter-only IC chip, for transmitting data through transmit pads that are installed in correspondence to a plurality of channels; and a loopback test circuit for receiving data as external loopback data through one of the transmit pads set as a receive pad for a test, the data being transmitted through one of the remaining transmit pads, and then comparing the received external loopback data with original transmit data.

16 Claims, 4 Drawing Sheets

TRANSMITTER-ONLY IC CHIP HAVING EXTERNAL LOOPBACK TEST FUNCTION AND EXTERNAL LOOPBACK TEST METHOD USING THE SAME

CROSS-REFERENCE TO RELATED APPLICATIONS

This U.S. non-provisional patent application claims priority under 35 U.S.C. §119 of Korean Patent Application No. 10-2009-0109151, filed in the Korean Intellectual Property Office on Nov. 12, 2009, the entire contents of which are hereby incorporated by reference.

BACKGROUND

The present inventive concept relates to an operation test of an integrated circuit (IC) chip, and more particularly, to an external loopback test in a transmitter-only IC chip.

Recently, operating frequencies of semiconductor ICs having a transceiver or transmitter function have dramatically increased due to a demand for a high speed multimedia system. These semiconductor ICs may be subjected to a loopback test before product shipment in order to test operating performance.

The loopback test is known as the most effective test method to verify physical layer (PHY) intellectual property (IP) in a serial interface, and is largely classified as an internal loopback test or an external loopback test.

In transceiver PHY having both transmit (TX) and receive (RX) capability, such as serial advanced technology attachment (SATA) or peripheral component interconnect express (PCIe) protocols, external loopback is possible during an at-speed test. However, since there is no receive pin for receiving signals from PHY with only TX, such as high-definition multimedia interface (HDMI) TX or low voltage differential signaling (LVDS) TX, external loopback is substantially impossible during an at-speed test.

In a case of PHY with only TX, if internal loopback is performed in a transmitter-only IC chip, it is completed based on a pre-driver stage without transmitting a signal to the exterior. Accordingly, an AC attribute test for final stage drivers connected to a transmit pad is not performed.

Therefore, conventionally, in order to perform an external loopback test in a transmitter-only IC chip, an additional receive pin and a separate RX unit for a test should be designed and mounted in a chip, or expensive high-speed test equipment is required for a test. However, the above methods increase IC size and manufacturing cost. Moreover, cost for an IC test is also increased.

As another method, golden RX is inserted on a test board of a tester to perform an external loopback test, but the test board becomes complex, and cost for setting and managing the golden RX is increased. In addition, since overkills or issues for each test may occur, depending on quality of the golden RX, a golden TX having controllability of an adequate level is required. Moreover, in a case of a test using the golden RX, test setup becomes relatively complex and thus test cost is increased also.

SUMMARY

The present inventive concept provides a transmitter-only integrated circuit (IC) chip for performing an external loopback test without an additional receive pin in a chip and an external loopback test method using the same.

The present inventive concept also provides a transmitter-only IC chip for performing an external loopback test while the size of a circuit in a chip for an external loopback is minimized or reduced, and an external loopback test method using the same.

The present inventive concept also provides an external loopback test method in a serial interface intellectual property (IP) used only for transmission.

The present inventive concept also provides an external loopback test method for performing an external loopback test on a transmitter-only IC chip without high speed test equipment and a transmitter-only IC chip having an external loopback test function.

According to one aspect, the present inventive concept is directed to a transmitter-only integrated circuit (IC) chip with an external loopback test function, including: drivers mounted on the transmitter-only IC chip for transmitting data through transmit pads that are installed in correspondence to a plurality of channels; and a loopback test circuit for receiving data as external loopback data through one of the transmit pads set as a receive pad for a test, the data being transmitted through one of the remaining transmit pads, and then comparing the received external loopback data with original transmit data.

In some embodiments, the loopback test circuit may include: a receive buffer connected to one of the transmit pads and enabled to receive data transmitted through one of the remaining transmit pads when a corresponding driver is disabled; and a monitoring unit for comparing external loopback data outputted from the receive buffer with the original transmit data to generate a test result signal.

In some embodiments, the monitoring unit may include: a pattern generator for generating original transmit data for the transmitted data; and a pattern comparator for comparing the output loopback data with the original transmit data.

In some embodiments, when a parallel-to-serial converter is installed at a preceding stage of the drivers, the monitoring unit may include: a serial-to-parallel converter connected between an output of the receiver buffer and the pattern comparator; and a deskewer for applying a clock with skew removed to the serial-to-parallel converter.

According to another aspect, the inventive concept is directed to a transmitter-only IC chip with an external loopback test function including: a plurality of serializers for converting original parallel data applied to each of a plurality of channels into serial data, respectively, in response to a conversion clock; drivers mounted on the transmitter-only IC chip for outputting the serial data outputted from each of the serializers through corresponding transmit pads; and a loopback test circuit for receiving serial data as external loopback data through one of the transmit pads set as a receive pad for a test, the serial data transmitted through one of the remaining transmit pads, recovering the received external loopback data into parallel data, and then comparing the restored parallel data with the original parallel data.

In some embodiments, the loopback test circuit may include: a pattern generator for generating the original parallel data; a receive buffer connected to the receive pad and enabled to receive the serial data when a corresponding driver is disabled; a parallelizer for recovering external loopback data outputted from the receive buffer into parallel data in response to an applied deskew clock; a deskewer for applying the deskew clock to the parallelizer; and a pattern comparator for comparing the parallel data outputted from the parallelizer with the original transmit data.

In some embodiments, the transmit pad set as the receive pad may be connected to a channel of the plurality of channels having the lowest data transmission speed.

In some embodiments, the deskewer may use the conversion clock applied to the serializer during the generating of the deskew clock.

According to another aspect, the inventive concept is directed to an external loopback test method in a transmitter-only IC chip including drivers for transmitting data through transmit pads that are installed in correspondence to a plurality of channels. The method includes: providing a receive buffer connected to one of the transmit pads for a loopback of the transmitted data; and obtaining a loopback test result by comparing external loopback data outputted from the receive buffer with original transmit data of the transmitted data.

In some embodiments, the transmit pad connected to the receive buffer may have a lower transmission speed than other transmit pads.

In some embodiments, when the transmitted data are serial data outputted through a serializer, the external loopback data may be recovered into parallel data using a conversion clock applied to the serializer and then compared.

In some embodiments, during the recovering of the parallel data, the conversion clock may be generated as a plurality of delay clocks through a plurality of delay taps of a deskewer in order to remove skew.

In some embodiments, when a loopback test is performed on data for a channel of a transmit pad connected to the receive buffer, a corresponding driver may be enabled to allow the data to be looped back into the receive buffer.

In some embodiments, when a loopback test is performed on data for a channel of a transmit pad connected to the receive buffer, the data may be looped back into another receive buffer different from the receive buffer.

In some, the loopback test may be sequentially performed one-by-one with respect to all the plurality of channels.

In some embodiments, the original transmit data may be generated by a pattern generator.

In some embodiments, the transmitter-only IC chip may be a high-definition multimedia interface (HDMI) TX physical layer (PHY).

In some embodiments, the transmitter-only IC chip may be a low voltage differential signaling (LVDS) TX PHY.

In some embodiments, the channel may include a fair line for transmitting a differential signal about serial data.

In some embodiments, during the recovering of the parallel data, multi-phase clocks, obtained by phase-shifting the conversion clock cumulatively by a predetermined time, may be used as recovery clocks.

BRIEF DESCRIPTION OF THE DRAWINGS

The foregoing and other features and advantages of the inventive concept will be apparent from the more particular description of preferred embodiments of the inventive concept, as illustrated in the accompanying drawings in which like reference characters refer to the same parts throughout the different views. The drawings are not necessarily to scale, emphasis instead being placed upon illustrating the principles of the inventive concept.

DETAILED DESCRIPTION OF THE EMBODIMENTS

Figure 1:
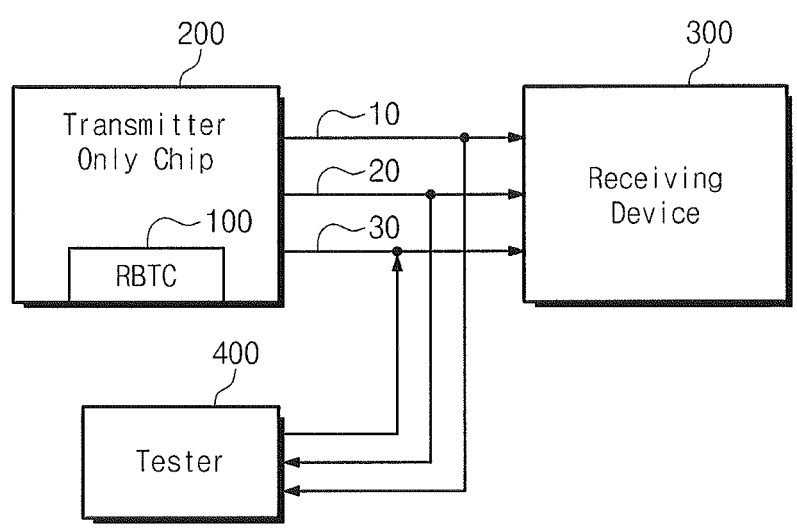
FIG. 1 is a schematic block diagram illustrating a wiring relationship of a transmitter-only integrated circuit (IC) chip according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this description will be thorough and complete, and will fully convey the inventive concept to those skilled in the art.

In this specification, if devices or lines are connected to a certain portion, they can be directly or indirectly connected thereto. Moreover, in the drawings, sizes of circuit blocks, devices, and lines may be exaggerated for effective description of technical contents. Each embodiment described herein may include complementary embodiments.

Like reference numbers refer to like components in the drawings, if possible.

FIG. 1 is a block diagram illustrating a wiring relationship of a transmitter-only integrated circuit (IC) chip according to an embodiment of the inventive concept.

Referring to FIG. 1, a transmitter-only IC chip 200 with on-board drivers for data transfer may include a loopback test circuit (or, RBTC) 100 according to an embodiment of the inventive concept. Lines 10, 20, and 30 of a transmit channel extending from transmit pins of the transmitter-only IC chip 200 may be connected to a receiving device 300 in an operation mode when not in a test. The line 30 may be set as a receive line during an external loopback test. Accordingly, the line 30 is connected to a tester 400 or a loopback output terminal of a test board, and the lines 10 and 20 are connected to the tester 400 or loopback input terminals of a test board.

During an external loopback test, the receiving device 300 is not connected to the transmitter-only IC chip 200. That is, when a driver connected to the line 30 set as a receive line is disabled during an external loopback test, a receive buffer connected in parallel to the driver is enabled. Therefore, when an external loopback test of FIG. 1 is performed, an additional pin for receiving channel data is not necessary in the transmitter-only IC chip.

Figure 2:
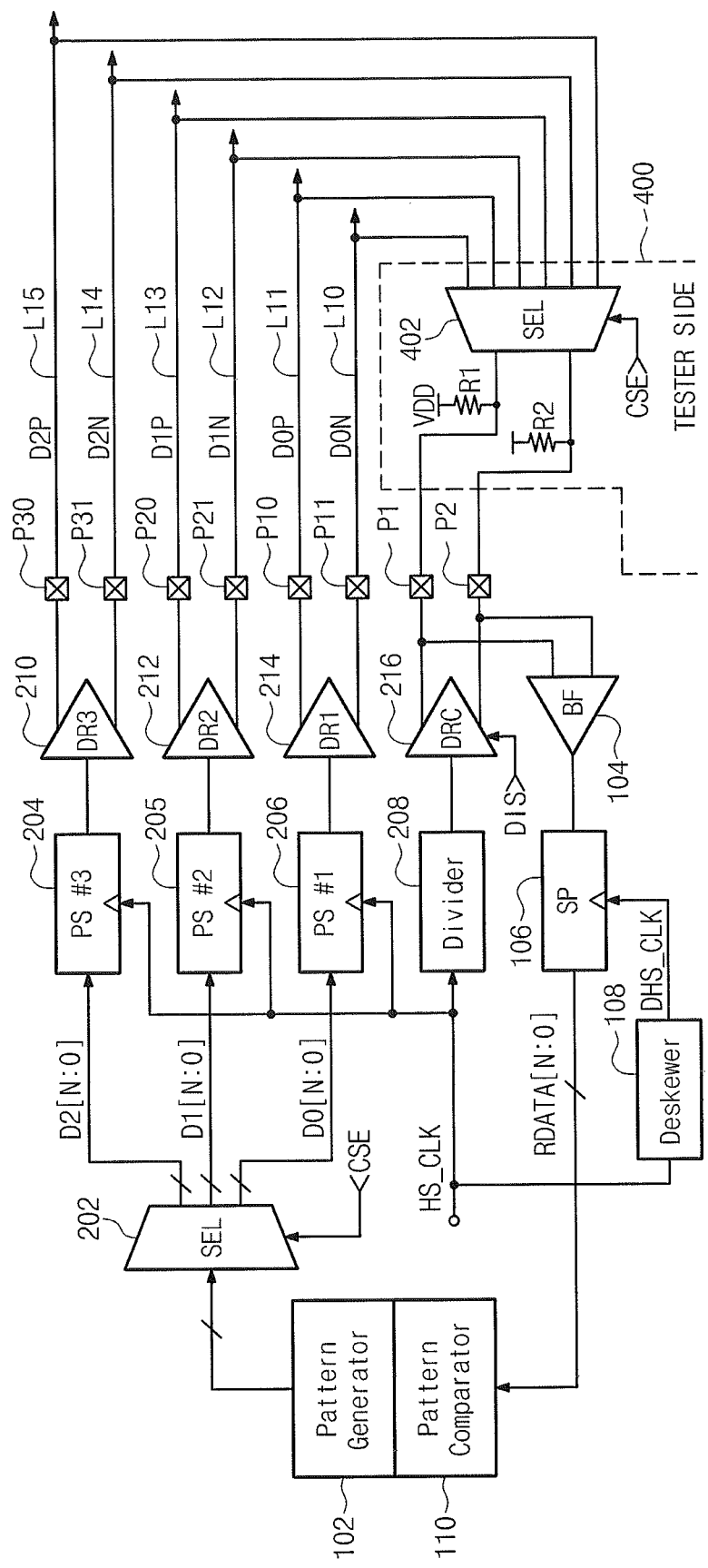
FIG. 2 is a detailed schematic block diagram of the transmitter-only IC chip of FIG. 1.

FIG. 2 is a schematic block diagram of a realization of the transmitter-only IC chip of FIG. 1.

Referring to FIG. 2, the transmitter-only IC chip 200 includes three data channels and one clock channel, for example. In the illustrated exemplary embodiment, a first data channel corresponds to a transmit line pair L10 and L11, a second data channel corresponds to transmit line pair L12 and L13, and a third data channel corresponds to a transfer line pair L14 and L15.

In addition, the clock channel is formed through a transmit pad pair P1 and P2. Each channel is implemented in a pair to improve transmission reliability by transmitting channel data or clocks as differential signals. A divided high speed clock is transmitted through the clock channel. In this case, a transmission speed of the clock, transmitted through the clock channel, may be set as about $\frac{1}{10}$ of a data transfer rate, for example. Accordingly, a divider 208 divides a high speed clock HS-CLK to generate a transmit clock with a frequency of about 1/10 the frequency of the high speed clock HS-CLK.

The transmitter-only IC chip 200 of FIG. 2 includes drivers 210, 212, and 214 for transmitting data through transmit pad pairs P10, P11, P20, P21, P30, and P31 installed in correspondence to a plurality of data transmit channels and a driver 216 for transmitting a clock signal through a transmit pad pair P1 and P2 installed in correspondence to a single clock transmit channel.

The loopback test circuit 100 of FIG. 1 receives data (which are transmitted through one pair of the remaining transmit pad pairs P10, P11, P20, P21, P30, and P31) as external loopback data through one pad pair P1 and P2 set as a receive pad for a test and compares the received external loopback data with original transmit data.

Referring to FIG. 2, as a result, the loopback test circuit 100 of FIG. 1 includes a receive buffer 104 and a monitoring unit. The monitoring unit includes a pattern generator 102, a pattern comparator 110, a deskewer 108, and a parallelizer 106. With these components, the loopback test circuit 100 compares external loopback data outputted from the receive buffer 104 with original transmit data in order to generate a test result signal.

The receive buffer 104 may be connected to one pair of the transmit pad pairs P1, P2, P10, P11, P20, P21, P30, and P31 and thus is connected to the block pad pair P1 and P2 in FIG. 2, for example. The receive buffer 104 is enabled to receive data, i.e., data selected from the first, second, and third data channels, looped back through the clock pad pair P1 and P2 when the corresponding driver 216 is disabled. The receive buffer 104 receives data, transmitted to the exterior through one channel, through the TX clock pad pair P1 and P2 such that an additional receive pin is not necessary at the exterior of the chip. Accordingly, external loopback is completed with low cost.

The tester 400 may include a selector 402 to select one of the plurality of channels. A channel selection signal CSE of the selector 402 may be identical to a channel selection signal CSE applied to the selector 202 connected to an output of the pattern generator 102. That is, if data generated from the pattern generator 102 during a test are transmitted through the first data channel, the selector 402 selects the first data channel to perform a corresponding external loopback. In FIG. 2, resistors R1 and R2 connected to respective output lines of the selector 402 are termination resistors. For example, in a case of a high-definition multimedia interface (HDMI) TX physical layer (PHY), since termination of about 50 ohm with respect to about 3.3 V is used, the resistors R1 and R2 are installed to perform a termination function.

In FIG. 2, the receive buffer 104 is connected with the clock pad pair P1 and P2 to reduce overhead and to simplify testing. The clock channel has a lower transmission frequency than the data channel and its transmission item is a clock pattern, not data.

If the clock pad pair P1 and P2 is used as a receive pad, although being used as automated test equipment (ATE) with a relatively slow test speed, a direct test becomes possible. That is, during a clock test, an external loopback test is not performed and a direct test is performed for a loopback test by receiving a transmit clock outputted from the driver 216 through the receive buffer 104. In this case, a speed of the transmit clock is slower than that of the transmit data, such that the test is possible with test equipment having relatively low speed.

When data transmitted from one of the data drivers 210, 212, and 214 are looped back into the receive buffer 104, the clock driver 216 is off in response to a disable signal DIS. In the clock driver 216, a parasitic capacitance of an output terminal may be increased slightly during a normal operation due to the presence of the receive buffer 104. However, since a clock with a lower transmission speed than a data channel is driven, performance degradation of the driver is not an issue. Similar to the above, when at least one of the TX pad, or pin, pairs is set as a RX pad, or pin, pair, the TX pad, or pin, corresponding to a channel with the slowest transmission speed may be set for reception.

In this embodiment, although the clock pad pair P1 and P2 is set as a receive pad, or pin, an arbitrary pad pair among data channels may be set as a receive pad, if necessary. In addition, another channel may be utilized as a receive channel in order to perform an external loopback test on a clock channel.

The parallelizer 106 is a serial-to-parallel converter to convert the looped back serial data into parallel data. A conversion clock DHS_CLK applied to the parallelizer 106 is obtained from the deskewer 108 for removing skew. In this exemplary embodiment, the conversion clock DHS_CLK is not generated from a separated clock generator circuit, but a high speed clock HS_CLK used for serializing transmit data in the chip 200 is used as it is for generating the conversion clock. Accordingly, a clock data recovery data for generating a recovery clock for recovering the loopback data into original data becomes unnecessary such that a simplified external loopback test can be realized.

Accordingly, if data transmitted through a channel are serial data outputted through the serializers 204, 205, and 206, the parallelizer 106 converts the serial loopback data into parallel data in response to the conversion clock DHS_CLK and then outputs the converted parallel data. In this exemplary embodiment, a clock used for generating the conversion clock DHS_CLS is not outputted to the exterior of the chip and is the high speed clock HS_CLK routed in a silicon chip.

Since the data of a loopback in the parallelizer 106 are delayed data that pass through an external cable or a printed circuit board (PCB) after being outputted through the driver 214, skew with respect to a phase of the high speed clock HS_CLK occurs. Accordingly, it is necessary to obtain the conversion clock DHS_CLK without skew and, therefore, the deskewer 108 is provided.

The deskewer 108 may include a plurality of delay devices D1, D2, D3, . . . Dn and a selector SE1, as shown in FIG. 3, in order to generate the conversion clock DHS_CLK without skew.

Figure 3:
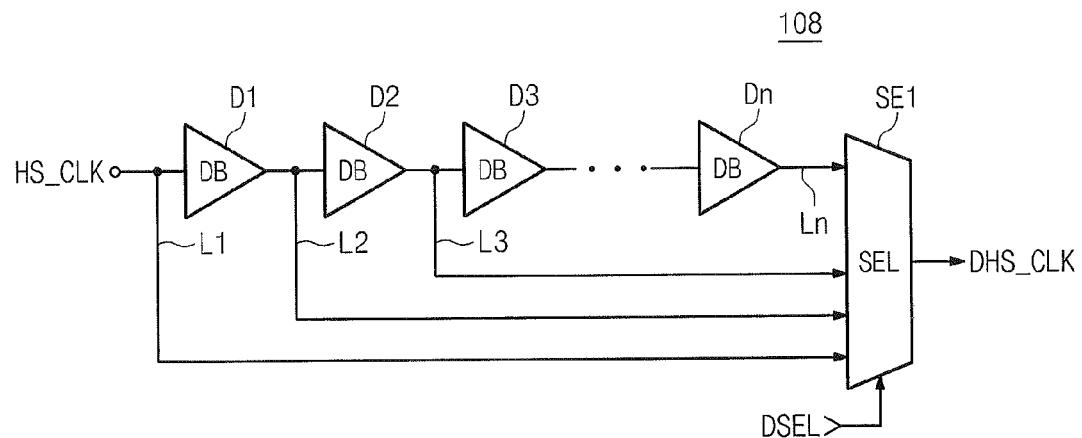
FIG. 3 is a schematic block diagram of a deskewer of FIG. 2.

Referring to FIG. 3, the deskewer of FIG. 2 is realized as an exemplary embodiment.

In FIG. 3, the delay devices D1, D2, D3, . . . Dn may be realized with a delay buffer or an inverter delay chain to provide the clock delay, and the selector SE1 may be realized with a multiplexer.

By a delay selection signal DSEL applied to the selector SE1, one of outputs of the tap lines L1, L2, L3, and Ln may be selected as the conversion clock DHS_CLK. The delay selection signal DSEL may be sequentially changed based on a comparison result of the pattern comparator 110. For example, if data recovered through a conversion clock DHS_CLK generated when the arbitrary tap line L1 is selected does not match the original parallel data, a delay selection signal for selecting the tap line L2 is applied to the selector SE1. A selection operation for each of the tap lines continues until the last tap line Ln is selected. If pattern matching is not obtained even through the last tap line Ln is selected, a test result is processed as FAIL. In addition, if pattern matching is obtained when one tap line is selected, a test result is processed as PASS.

A delay interval of the delay devices D1, D2, D3, . . . Dn is appropriately compensated for skew, and the number of delay devices may be increased or decreased, if necessary.

If the deskewer 108 as illustrated in FIG. 3 is employed, skew between the high speed clock HS_CLK and the external loopback data can be effectively removed without using a complex deskewer circuit.

Figure 4:
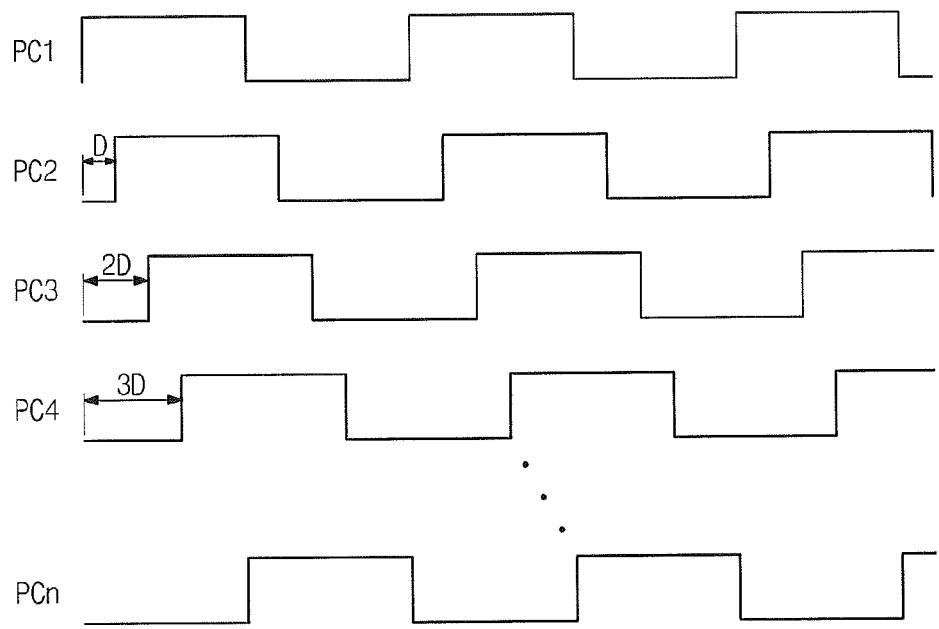
FIG. 4 is a waveform diagram of the parallelizer of FIG. 2.

FIG. 4 is a waveform diagram of the parallelizer of FIG. 2. An x-axis represents time and a y-axis represents a voltage waveform or a current waveform. There is a phase difference by a delay D between A first multi phase clock PC1 and a second multi phase clock PC2. In addition, a third multi phase clock PC3 has a delayed phase by a delay 2D compared to the first multi phase clock PC1.

As shown in FIG. 3, when deskewing is performed using the delay devices D1, D2, D3, . . . , Dn, there may delay variation in the delay devices D1, D2, D3, . . . , Dn themselves. Accordingly, as shown in FIG. 4, when deskewing is performed using the first to nth multi phase clocks PC1 to PCn, deskewing accuracy is improved.

Referring to FIG. 2 again, the external loopback test in a transmitter-only chip with three data channels and one clock channel will be described below.

If the transmit pad pair P1 and P2 of the clock channel is set as a receive pad pair, the selector 402 of the tester 400 is connected as shown in FIG. 2, and the clock driver 216 is disabled. Once the test starts, original transfer data for the test is generated in the pattern generator 102. For example, when the channel selection signal CSE is applied as a signal for selecting the first data channel, the selector 202 and the selector 402 of the tester 400 select the first data channel simultaneously. Accordingly, the original transmit data are applied to a first parallel-to-serial converter 206 as N+1 parallel data D0. The first parallel-to-serial converter 206, i.e., a serializer, converts the original transmit data into serial data in response to the high speed clock HS_CLK. The data driver 214 drives and outputs the serial data to the transmit pad pair P10 and P11. The transmit data outputted through the transmit pad pair P10 and P11 are looped back to the clock pad pair P1 and P2 through the selector 402 of the tester 400. In this case, since the transmit data are fed back after being outputted to the exterior through a pad or a pin of a chip, they become external loopback data, not internal loopback data. The transmit data are inputted and buffered in the receive buffer and then are applied to the parallelizer 106 (serving as a serial-to-parallel converter) as external loopback data. The parallelizer 106 converts the transmit data into parallel data in response to the conversion clock DHS_CLK with skew removed. The parallel data converted by the parallelizer 106 become recovered data RDATA. The pattern comparator 110 compares the recovered data RDATA with the original transmit data to determine whether they are identical, such that an external loopback test result is obtained.

If the test result of the pattern comparator 110 is FAIL, a selection signal DSEL applied to the selector SE1 of the deskewer 108 is applied to output a clock corresponding to the waveform PC2 of FIG. 4. The parallelizer 106 converts the transmit data into parallel data in response to a conversion clock DHS_CLK like a clock corresponding to the waveform PC2. The recovered data outputted from the parallelizer 106 are applied to the pattern comparator 110 and then compared with the original transmit data again. If the test result is FAIL again, a selection signal DSEL applied to the selector SE1 of the deskewer 108 is applied to output a clock corresponding to the waveform PC3 of FIG. 4. Accordingly, the parallelizer 106 converts the transmit data into parallel data in response to the conversion clock DHS_CLK like a clock corresponding to the waveform PC3. The recovered data RDATA outputted from the parallelizer 106 are applied to the pattern comparator 110 and compared with the original transmit data again. If the test result is continuously FAIL, a comparison operation repeats until a clock corresponding to the waveform PCn of FIG. 4 is outputted as a conversion clock DHS_CLK. Even when the recovered data obtained using the clock corresponding to the waveform PCn as a conversion clock DHS_CLK does not match the original transmit data, an external loopback test result about the first data channel is determined as FAIL.

When the external loopback test result about the first data channel is determined as FAIL or when the test result is PASS because the recovered data RDATA converted using a clock corresponding to one of the waveforms PC1 to PCn matches the original transmit data, the external loopback test about the first data channel is terminated.

Next, in order to perform an external loopback test for a second data channel, the selector 202 and the selector 402 of the tester 400 select the second data channel simultaneously. Accordingly, the original transmit data are applied to the second parallel-to-serial converter 205 as N+1 parallel data D0. The second parallel-to-serial converter 205, i.e., a serializer, converts the original transmit data into serial data in response to a high speed clock HS_CLK. The data driver 212 drives and outputs the serial data to the transmit pad pair P20 and P21. The transmit data outputted through the transmit pad pair P20 and P21 are looped back to the clock pad pair P1 and P2 through the selector 402 of the tester 400. In the same manner, the transmit data are inputted and buffered in the receive buffer 104 and then applied to the parallelizer 106 (serving as a serial-to-parallel converter) as external loopback data. The parallelizer 106 converts the transmit data into parallel data in response to a conversion clock DHS_CLK with skew removed by the deskewer 108. The pattern comparator 110 compares the recovered data RDATA with the original transmit data to determine whether they are the same, such that the external loopback test result about the second data channel can be obtained. This comparison operation is the same as that of the first data channel.

Like the above, when an IC chip has a plurality of transmit channels, the loopback test may be sequentially performed on each of the plurality of channels.

In addition, if a loopback test is performed by itself on a clock regarding a channel of a transmit pad connected to the receive buffer 104, the clock driver 216 is enabled and drives the clock.

Figure 5:
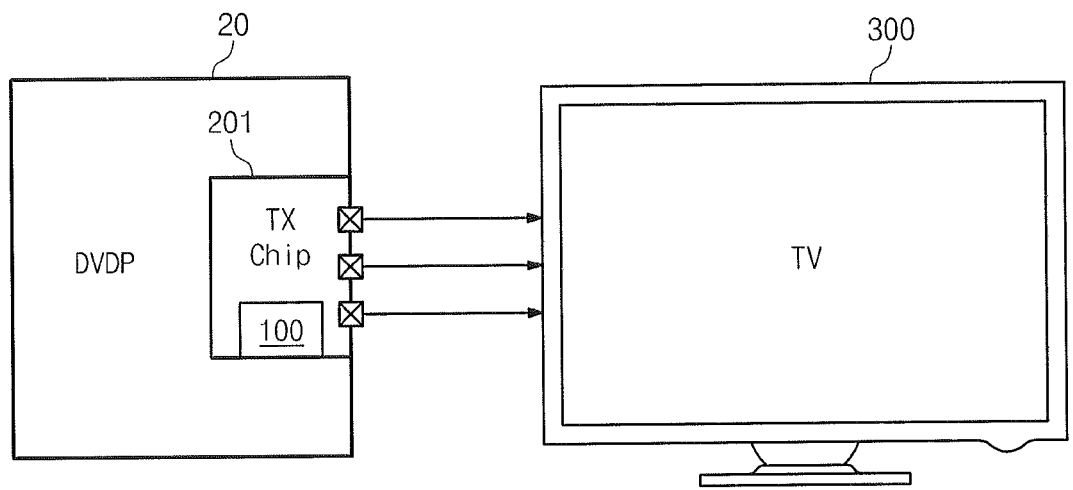
FIG. 5 is a schematic block diagram of a multimedia transmission system in which the chip of FIG. 1 is applied as a high-definition multimedia interface (HDMI) TX physical layer (PHY).

FIG. 5 is a block diagram of a multimedia transmission system in which the chip of FIG. 1 is applied as HDMI TX PHY. Referring to FIG. 5, a DVD player 20 includes a transmitter-only chip 201 according to the embodiments of the inventive concept. The transmitter-only chip 201 may include a loopback test circuit 100 according to the embodiments of the inventive concept. The transmitter-only chip 201 may be paired with a television having a plasma display panel (PDP) or a liquid crystal display (LCD).

During an external loopback test of the transmitter-only chip 201, an external loopback is performed on a data path, and a clock path may be set as a receive channel for receiving external loopback data. During the recovering of the external loopback data, a deskewed conversion clock is used. The recovered data is compared with original data in a pattern comparator and it is determined that the recovered data matches the transmitted data pattern. In addition, if there are a plurality of data transmit channels, a test is performed on each channel.

In FIG. 5, an HDMI cable for transmitting digital signal allocated to a pin 19 may be installed between the transmitter-only chip 201 and the television 300.

Figure 6:
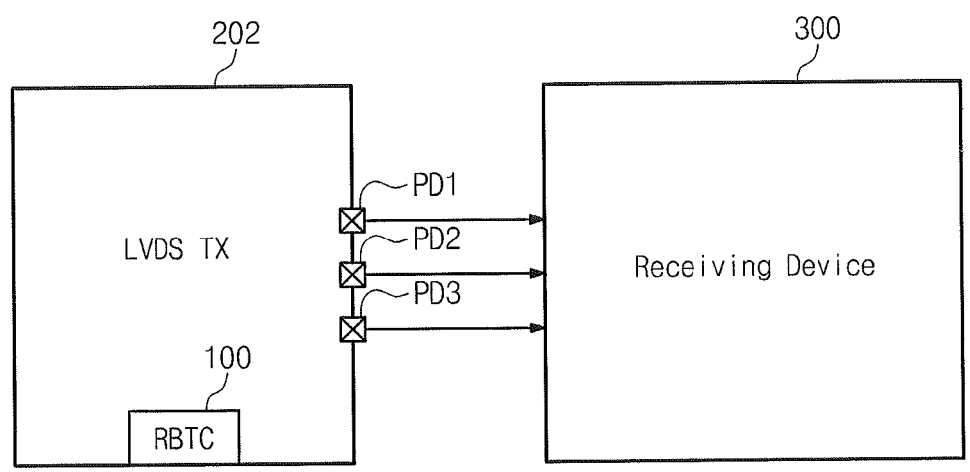
FIG. 6 is a schematic block diagram of a system in which the chip of FIG. 1 is applied as a low voltage differential signaling (LVDS) TX PHY.

FIG. 6 is a block diagram of a system in which the chip of FIG. 1 is applied as low voltage differential signaling (LVDS) TX PHY. Referring to FIG. 6, a loopback test circuit 100 is employed in an LVDS TX transmitter-only chip 202. The other side of the transmitter-only chip 202 may be a receiving device 300 with a display screen. Although a cable is connected through the three pads PD1, PD2, and PD3, an LVDS cable for transmitting signal allocated to the pin 30 or the pin 50 of FIG. 1 may be installed.

In addition, according to the embodiments of the inventive concept, a chip applied as HDMI TX PHY is mainly described, but other transmitter-only chips also may be used.

According to embodiments of the inventive concept, an external loopback test is performed on a transmitter-only IC chip inexpensively. In addition, without using expensive equipment, performances of all PHY including drivers in a chip are tested through an at-speed method. Moreover, in a case of the external loopback test, an additional pin for receiving channel data is not necessary in a transmitter-only IC chip, and a complex circuit such as a clock data recovery circuit for generating a clock to recover loopback data is not necessary in a chip.

The above-disclosed subject matter is to be considered illustrative and not restrictive, and the appended claims are intended to cover all such modifications, enhancements, and other embodiments, which fall within the true spirit and scope of the inventive concept. For example, the number of channels, configurations of receive pads, or the number of receive buffers may vary, without departing from the technical scope of the inventive concept.

What is claimed is:

1. A transmitter-only integrated circuit (IC) chip with an external loopback test function, comprising:
    drivers mounted on the transmitter-only IC chip for transmitting data through transmit pads that are installed in correspondence to a plurality of channels; and
    a loopback test circuit for receiving data as external loopback data through one of the transmit pads set as a receive pad for a test, the data being transmitted through one of the remaining transmit pads, and then comparing the received external loopback data with original transmit data,
    wherein the loopback test circuit comprises:
        a receive buffer connected to one of the transmit pads and enabled to receive data transmitted through one of the remaining transmit pads when a corresponding driver is disabled; and
        a monitoring unit for comparing external loopback data outputted from the receive buffer with the original transmit data to generate a test result signal.

2. The transmitter-only IC chip of claim 1, wherein the monitoring unit comprises:
    a pattern generator for generating original transmit data for the transmitted data; and
    a pattern comparator for comparing the output loopback data with the original transmit data.

3. The transmitter-only IC chip of claim 2, wherein, when a parallel-to-serial converter is installed at a preceding stage of the drivers, the monitoring unit comprising:
    a serial-to-parallel converter connected between an output of the receiver buffer and the pattern comparator; and
    a deskewer for applying a clock with skew removed to the serial-to-parallel converter.

4. A transmitter-only IC chip with an external loopback test function, comprising:
    a plurality of serializers for converting original parallel data applied to each of a plurality of channels into serial data, respectively, in response to a conversion clock;
    drivers mounted on the transmitter-only IC chip for outputting the serial data outputted from each of the serializers through corresponding transmit pads; and
    a loopback test circuit for receiving serial data as external loopback data through one of the transmit pads set as a receive pad for a test, the serial data transmitted through one of the remaining transmit pads, recovering the received external loopback data into parallel data, and then comparing the restored parallel data with the original parallel data,
    wherein the loopback test circuit comprises:
        a pattern generator for generating the original parallel data;
        a receive buffer connected to the receive pad and enabled to receive the serial data when a corresponding driver is disabled;
        a parallelizer for recovering external loopback data outputted from the receive buffer into parallel data in response to an applied deskew clock;
        a deskewer for applying the deskew clock to the parallelizer; and
        a pattern comparator for comparing the parallel data outputted from the parallelizer with the original transmit data.

5. The transmitter-only IC chip of claim 4, wherein the transmit pad set as the receive pad is connected to a channel of the plurality of channels having the lowest data transmission speed.

6. The transmitter-only IC chip of claim 5, wherein the deskewer uses the conversion clock applied to the serializer during the generating of the deskew clock.

7. An external loopback test method in a transmitter-only IC chip including drivers for transmitting data through transmit pads that are installed in correspondence to a plurality of channels, the method comprising:
    providing a receive buffer connected to one of the transmit pads for a loopback of the transmitted data; and
    obtaining a loopback test result by comparing external loopback data outputted from the receive buffer with original transmit data of the transmitted data,
    wherein, when the transmitted data are serial data outputted through a serializer, the external loopback data are recovered into parallel data using a conversion clock applied to the serializer and then compared, during the recovering of the parallel data, the conversion clock is generated as a plurality of delay clocks through a plurality of delay taps of a deskewer in order to remove skew.

8. The method of claim 7, wherein the transmit pad connected to the receive buffer has a lower transmission speed than other transmit pads.

9. The method of claim 7, wherein, when a loopback test is performed on data for a channel of a transmit pad connected to the receive buffer, a corresponding driver is enabled to allow the data to be looped back into the receive buffer.

10. The method of claim 7, wherein, when a loopback test is performed on data for a channel of a transmit pad connected to the receive buffer, the data are looped back into another receive buffer different from the receive buffer.

11. The method of claim 7, wherein the loopback test is sequentially performed one-by-one with respect to all the plurality of channels.

12. The method of claim 7, wherein the original transmit data are generated by a pattern generator.

13. The method of claim 7, wherein the transmitter-only IC chip is a high-definition multimedia interface (HDMI) TX physical layer (PHY).

14. The method of claim 7, wherein the transmitter-only IC chip is a low voltage differential signaling (LVDS) TX PHY.

15. The method of claim 7, wherein the channel comprises a fair line for transmitting a differential signal about serial data.

16. The method of claim 7, wherein, during the recovering of the parallel data, multi-phase clocks, obtained by phase-shifting the conversion clock cumulatively by a predetermined time, are used as recovery clocks.

* * * * *